US009736552B2

(12) United States Patent
Chang et al.

(10) Patent No.: US 9,736,552 B2
(45) Date of Patent: *Aug. 15, 2017

(54) AUTHORING SYSTEM FOR IPTV NETWORK

(71) Applicant: AT&T INTELLECTUAL PROPERTY I, LP, Atlanta, GA (US)

(72) Inventors: Hisao Chang, Medina, MN (US); Javier Arellano, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/814,955

(22) Filed: Jul. 31, 2015

(65) Prior Publication Data

US 2015/0341708 A1 Nov. 26, 2015

Related U.S. Application Data

(63) Continuation of application No. 14/253,527, filed on Apr. 15, 2014, now Pat. No. 9,131,285, which is a
(Continued)

(51) Int. Cl.
*H04N 21/8549* (2011.01)
*H04N 21/40* (2011.01)
(Continued)

(52) U.S. Cl.
CPC ......... *H04N 21/8549* (2013.01); *G10L 15/26* (2013.01); *G11B 27/034* (2013.01);
(Continued)

(58) Field of Classification Search
CPC ........... H04L 12/2801; H04L 29/06047; H04L 29/08162; H04L 29/08225;
(Continued)

(56) References Cited

U.S. PATENT DOCUMENTS 5,659,793 A     8/1997    Escobar
5,835,667 A * 11/1998    Wactlar ............. G06F 17/30787
                                                                 386/241

(Continued)

FOREIGN PATENT DOCUMENTS

GB        2375631      11/2002
JP         10285460      10/1998

OTHER PUBLICATIONS

"Sofia Digital: New releases of iTV Content Authoring Tools", Digi TV; Press Release Sep. 9, 2004 {Sep. 9, 2004), 2 pgs.

(Continued)

*Primary Examiner* — Benjamin R Bruckart
*Assistant Examiner* — Anthony Bantamoi
(74) *Attorney, Agent, or Firm* — Guntin & Gust, PLC; Jay H. Anderson

(57) ABSTRACT

In an embodiment, a system and method permit an IPTV subscriber to display on a channel of an IPTV network video data from a subscriber video database. The system may include, in addition to the IPTV network and the subscriber database, an IPTV server and an IPTV set top box. The IPTV set top box is configured to receive commands causing the IPTV set top box to retrieve video data from an IPTV subscriber database, display the video data on an IPTV display unit; and to transmit the video data over an IPTV network to an IPTV server. The IPTV server is configured to transmit the video data from the IPTV server over the IPTV network such that the video data is displayable on a channel of the IPTV network.

20 Claims, 6 Drawing Sheets

Related U.S. Application Data continuation of application No. 11/520,092, filed on Sep. 12, 2006, now Pat. No. 8,739,240.

(51) Int. Cl.
| | |
|---|---|
| *H04N 21/643* | (2011.01) |
| *G10L 15/26* | (2006.01) |
| *G11B 27/034* | (2006.01) |
| *H04N 7/167* | (2011.01) |
| *H04N 9/79* | (2006.01) |
| *H04N 21/435* | (2011.01) |
| *H04N 21/472* | (2011.01) |
| *H04N 21/61* | (2011.01) |

(52) U.S. Cl.
CPC ............ *H04N 7/1675* (2013.01); *H04N 9/79* (2013.01); *H04N 21/40* (2013.01); *H04N 21/435* (2013.01); *H04N 21/47205* (2013.01); *H04N 21/6125* (2013.01); *H04N 21/64322* (2013.01)

(58) Field of Classification Search
CPC ........... H04L 29/08522; H04L 29/0872; H04L 67/1002; H04L 67/1091; H04L 67/42; H04N 7/17309; H04N 21/42676; H04N 21/6168; H04N 21/6118; H04N 7/1675; H04N 7/163; H04N 21/4181; H04N 21/26606; H04N 21/435; H04N 5/93; H04N 5/76; H04N 5/783; H04N 2005/44547; H04N 2005/44556; H04N 2005/44565; H04N 5/44543; G11B 15/1875; G11B 27/031; G06K 9/00765
See application file for complete search history.

(56) References Cited

U.S. PATENT DOCUMENTS

| | | | | |
|---|---|---|---|---|
| 6,154,600 | A * | 11/2000 | Newman | G06F 3/0213 |
| | | | | 348/552 |
| 6,259,443 | B1 | 7/2001 | Williams | |
| 6,351,765 | B1 * | 2/2002 | Pietropaolo | G11B 27/034 |
| | | | | 348/722 |
| 6,397,388 | B1 | 5/2002 | Allen | |
| 6,480,819 | B1 | 11/2002 | Boman | |
| 6,529,233 | B1 | 3/2003 | Allen | |
| 6,760,916 | B2 | 7/2004 | Holtz | |
| 7,035,335 | B1 * | 4/2006 | Iacobelli | H04N 21/434 |
| | | | | 348/E5.005 |
| 7,443,449 | B2 | 10/2008 | Momosaki | |
| 7,565,680 | B1 * | 7/2009 | Asmussen | H04N 7/147 |
| | | | | 715/758 |
| 7,725,830 | B2 * | 5/2010 | Vronay | G06F 17/241 |
| | | | | 715/704 |
| 2001/0036355 | A1 * | 11/2001 | Kelly | G11B 27/034 |
| | | | | 386/290 |
| 2002/0126035 | A1 | 9/2002 | Hou | |
| 2003/0041326 | A1 | 2/2003 | Novak | |
| 2004/0055017 | A1 | 3/2004 | Delpuch | |
| 2004/0070595 | A1 | 4/2004 | Atlas | |
| 2004/0139318 | A1 | 7/2004 | Fiala | |
| 2004/0139481 | A1 * | 7/2004 | Atlas | G06F 17/2241 |
| | | | | 725/135 |
| 2004/0226051 | A1 | 11/2004 | Carney | |
| 2005/0008343 | A1 * | 1/2005 | Frohlich | G11B 27/034 |
| | | | | 386/239 |
| 2005/0010950 | A1 | 1/2005 | Carney | |
| 2005/0084232 | A1 | 4/2005 | Herberger | |
| 2005/0125232 | A1 | 6/2005 | Gadd | |
| 2005/0171964 | A1 | 8/2005 | Kulas | |
| 2006/0039041 | A1 | 2/2006 | Saeda | |
| 2006/0075429 | A1 | 4/2006 | Istvan | |
| 2007/0136752 | A1 | 6/2007 | Sanders | |
| 2007/0277205 | A1 | 11/2007 | Grannan | |
| 2008/0052630 | A1 | 2/2008 | Rosenbaum | |
| 2008/0263585 | A1 | 10/2008 | Gell | |
| 2009/0074375 | A1 * | 3/2009 | Ramasubramaniam | G11B 27/034 |
| | | | | 386/283 |

OTHER PUBLICATIONS

MAAD, "Maril YN: A Novel Platform for Intelligent Interactive TV (IITV)", Proceedings of Human Coml2uter Interaction International HCII2003 Conference (Jul. 2003),1-6.

MAAD, "Universal Access to MultimodalITV Content: Challenges and Prospects", Lecture Notes in Computer Science 2615 (2003),195-208.

* cited by examiner

… (1)

AUTHORING SYSTEM FOR IPTV NETWORK

CROSS-REFERENCE TO RELATED APPLICATIONS

This application is a continuation of U.S. application Ser. No. 14/253,527, filed Apr. 15, 2014 (now U.S. Pat. No. 9,131,285), which is a continuation of U.S. application Ser. No. 11/520,092, filed Sep. 12, 2006 (now U.S. Pat. No. 8,739,240), which are incorporated by reference herein in their entirety.

FIELD OF THE DISCLOSURE

Various embodiments relate to Internet Protocol Television (IPTV) networks, and in an embodiment, but not by way of limitation, to IPTV networks that allow subscribers to display content on IPTV channels.

BACKGROUND OF THE DISCLOSURE

Video content can be distributed to a plurality of viewers in several ways. The system and method of broadcasting over the public airways has long been established and enjoyed by literally millions of people worldwide. However, shortcomings such as limited transmission distance, poor reception quality, and limited bandwidth and channel availability, led to the installation of cable and satellite television systems in recent years. Satellite and cable systems offer greater bandwidth and channel availability, and higher quality reception.

With the development of the Internet and other public and private IP networks, Internet Protocol Television (IPTV) systems have become the most recent means of distributing video content to a plurality of users. An IPTV network offers many of the advantages of a cable or satellite television network. An IPTV network also offers advantages over cable and satellite systems because of the IP technology involved.

DETAILED DESCRIPTION OF THE DRAWINGS

Figure 1:
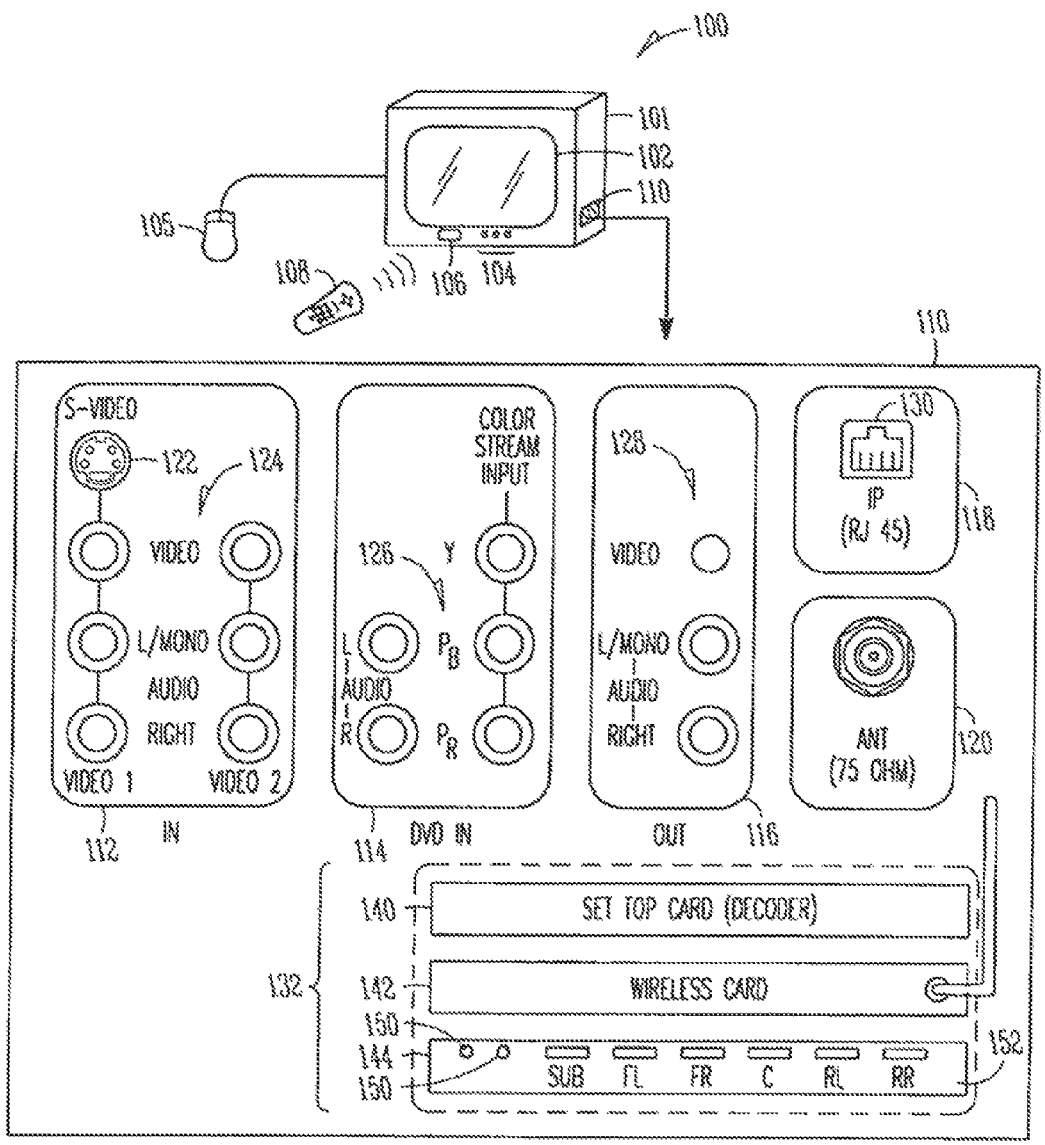
FIG. 1 illustrates an embodiment of a multimedia processing device such as a networked television.

Referring to FIG. 1, an example embodiment of a multimedia processing device such as a networked television 100 is illustrated in accordance with at least one embodiment of the present disclosure. As depicted, the television 100 includes a housing 101 that contains a display 102 (e.g., a liquid crystal display or a plasma display). Further, the housing 101 includes a plurality of user interface buttons 104, such as a power button, channel change buttons, volume control buttons, and the like. The housing 101 also includes a remote control interface 106, for example an infrared interface or a radio frequency (RF) interface, to receive remote control commands from a remote control 108. Other input devices such as a mouse 105 may also be coupled to the television 100. In a particular embodiment, one or more operations of the television 100 are responsive to the remote control commands. The television 100 further includes an interface panel 110 that is accessible via an external surface of the housing 101, for example at a top, back or side surface of the housing 101. The interface panel 110 includes one or more interfaces for receiving or outputting various forms of multimedia data. As shown, the interface panel 110 includes an IN component 112 that includes, for example, an S-video receptacle 122 and audio-visual receptacles 124, and a digital versatile disk (DVD) IN component 114 that is configured to receive video data and audio data from an external DVD player or other multimedia source. In particular, the DVD IN component 114 includes a plurality of receptacles 126 that can receive component video and audio. The panel 110 also can include an OUT component 116 that has receptacles 128 to provide video data and/or audio data to another television or recording device, such as a personal video recorder (PVR) or an external DVD player/recorder. An RF antenna receptacle 120 also can be incorporated into the panel 110 to receive multimedia data via RF transmissions.

In at least one embodiment, the panel 110 further includes a network interface 118 that includes a network receptacle 130 that can be connected to any of a variety of packet-based data networks. The receptacle 130 can be connected to an Internet Protocol (IP)-based network, for example an Ethernet network or an asynchronous transfer mode (ATM)-based network. Further, in a particular embodiment, the network interface 118 can include an Ethernet interface, and as such, the network receptacle 130 can be an RJ-45 receptacle that is configured to receive an Ethernet cable that is connected to an Ethernet-based network. The television 100 can utilize the network interface 118 to receive multimedia data, for example video data, audio data, or video game data, over a packet-based network for processing at the television 100. Moreover, the network interface 118 may be used by the television 100 to forward information to another networked device, such as another networked television 100. The forwarded information may include, for example, processed multimedia data or information associated with the multimedia data, information associated with a video game being played at the television 100, and the like.

As illustrated in FIG. 1, the panel 110 further can include one or more modular card receptacles 132 (also commonly referred to as "expansion slots") to interface with one or more modular cards (also commonly referred to as "expansion cards") to enhance the functionality of the television 100. The modular cards can include, for example, a multimedia decoder modular card 140, a wireless network interface modular card 142, an audio receiver modular card 144, and the like. In a particular embodiment, the modular card receptacles 132 and the corresponding modular cards 140, 142, and 144, may be implemented using a standard architecture, such as a Peripheral Component Interconnect (PCI)-compliant architecture, an Industry Standard Architecture (ISA)-compliant architecture, or a Personal Computer Memory Card International Association (PCMCIA)-compliant architecture. Alternatively, the modular card receptacles 132 and the corresponding modular cards 140, 142, and 144 may be implemented using a proprietary architecture, or a combination of standard and proprietary architectures.

To customize the functionality of the television 100, modular cards may be added or removed from the television by inserting or removing the modular cards from their corresponding modular card receptacles. For example, the panel 110 may include an opening in the housing for each modular card receptacle 132 and each modular card receptacle 132 may receive a modular card that is inserted through the corresponding opening so that the contacts of the modular card receptacle interface are brought into secure contact with the contacts of the receiving modular card receptacle 132. Alternatively, part or all of the panel 110 can be temporarily removed to install the modular card in a modular card receptacle 132. In at least one embodiment, some or all of the modular cards may include one or more interface receptacles that are accessible at the panel 110 to interface with other components.

In a particular embodiment, the incorporation of one or more modular cards into the television 100 allows for an expansion of the available functionality of the television 100. For example, the television 100 may incorporate the wireless network interface modular card 142 to provide wireless connectivity for the transmission of information to other networked devices. Moreover, the television 100 may incorporate the multimedia decoder modular card 140 to process multimedia data. The processing performed by the multimedia decoder modular card 140 may include, for example, decoding or transcoding encoded multimedia data, encoding non-coded multimedia data, decrypting encrypted multimedia data, and the like.

In an embodiment, the multimedia data processed by the decoder modular card 140 may be obtained from an external multimedia device, such as a DVD player, via the interfaces 122-128. Alternatively, the multimedia data may be received as a multimedia data stream via the network interface 118 or via the wireless interface modular card 142. The video content of the resulting processed multimedia data may be displayed on the display 102 or the resulting processed multimedia data may be provided to one or more networked devices via the network interface 118 or the wireless network interface modular card 142.

The television 100 can also incorporate the audio receiver modular card 144 to process audio data for output to one or more speakers. In one embodiment, the audio receiver modular card 144 provides many of the features commonly found in separate stereo receivers. The audio data may be received from an external audio device, e.g., a portable music player, via one or more audio inputs 150. Alternatively, the audio data may be received via the network interface 118 or the wireless network interface modular card 142. The resulting processed audio data may be provided to one or more wired speakers via speaker outputs 152 or the resulting processed audio data may be provided to one or more wireless speakers via, for example, the wireless network interface modular card 142.

Figure 2:
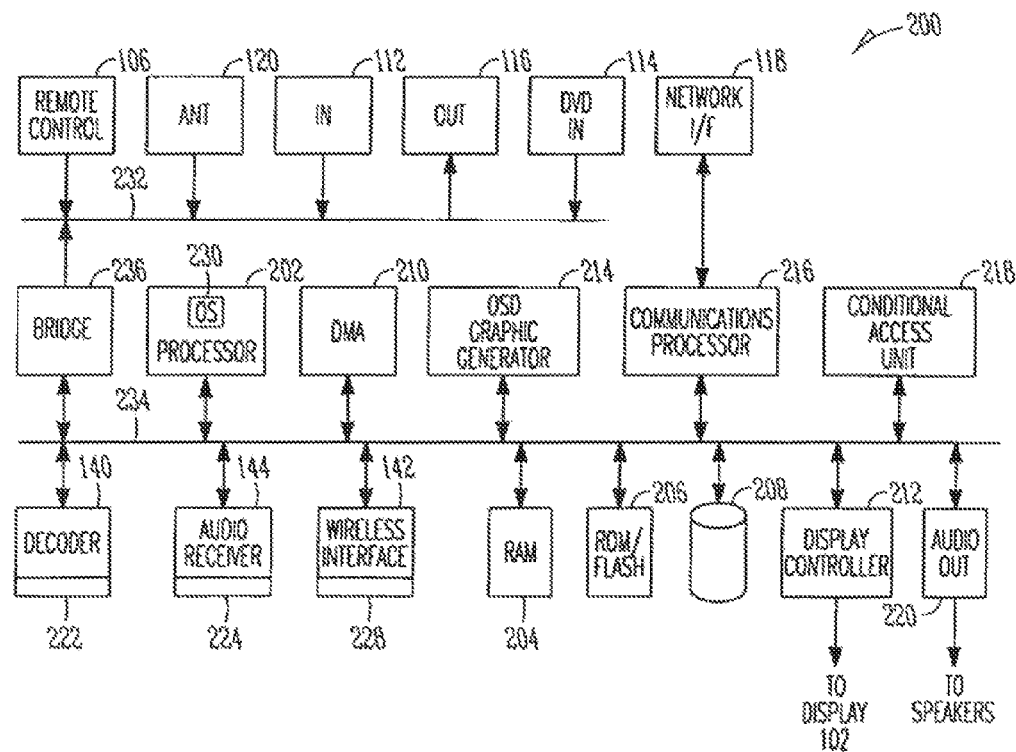
FIG. 2 illustrates a block diagram of an architecture of the networked television of FIG. 1.

Referring to FIG. 2, an example embodiment of an architecture 200 of the television 100 is illustrated in accordance with at least one embodiment of the present disclosure. The television 100 includes one or more processors 202 (which in an embodiment may be referred to as television-based processors), one or more storage devices, such as a random access memory (RAM) 204, a read only memory (ROM) or flash memory 206 or a hard disk 208, a direct memory access controller (DMA) 210 and a display controller 212 coupled to the display 102 (FIG. 1). The television 100 also can include an overlay graphics generator 214, a network communications processor 216 connected to the network interface 118, a conditional access unit 218, and an audio output 220. The television 100 further can include modular card receptacles 222, 224, and 228 connected to the multimedia decoder modular card 140, the audio receiver modular card 144, and the wireless network interface modular card 142, respectively. As depicted in FIG. 2, the television 100 can further include the remote control interface 106, the RF antenna interface 120, the IN component 112, the OUT component 116, and the DVD IN component 114 of the panel 110 (FIG. 1). In the illustrated example, some components of the television 100 can be connected to a first bus 232 while other components can be connected via a second bus 234. Further, the busses 232, 234 can be connected by a bridge bus 236.

During operation, the various components of the television 100 communicate information via the busses 232, 234 in order to perform various multimedia related functions. For example, the communications processor 216 provides communications protocol specific processing for data received via the network interface 118 and for data to be transmitted on a packet based network via the network interface 118. Further, the communications processor 216 may implement one or more functions associated with, the Open Systems Interconnection (OSI) seven layer model or the Telecommunications Protocol/Internet Protocol (TCP/IP) stack. During operation, incoming data that is processed by the communications processor 216 can be routed to one or more of the components of the television 100 as appropriate. The DMA controller 210 can control access to the RAM 204 and/or the ROM 206 by the components of the television 100. Moreover, the overlay graphics generator 214 can generate overlay graphics that overlay the display graphics that are output to the display 102 by the display controller 212.

In a particular embodiment, the modular cards 140-144 may communicate information with each other and with other components of the television, for example, the processor 202 or the display controller 212, using the modular card receptacles 222-228 and the bus 234. For example, the wireless network interface modular card 142 or the network interface 118 may be used to receive/transmit audio data for the audio receiver modular card 144. Alternatively, multimedia data may be received via one or more of the RF antenna interface 120, the IN component 112, or the DVD IN component 114. Further, video data that represents video content may be provided from the decoder modular card 140 to the display controller 212 so that the video content is displayed by the display 102. Similarly, audio data representing audio content may be provided from the audio receiver modular card 144 to the audio output 220 for output of the audio content by one or more speakers of the television 100.

Figure 3:
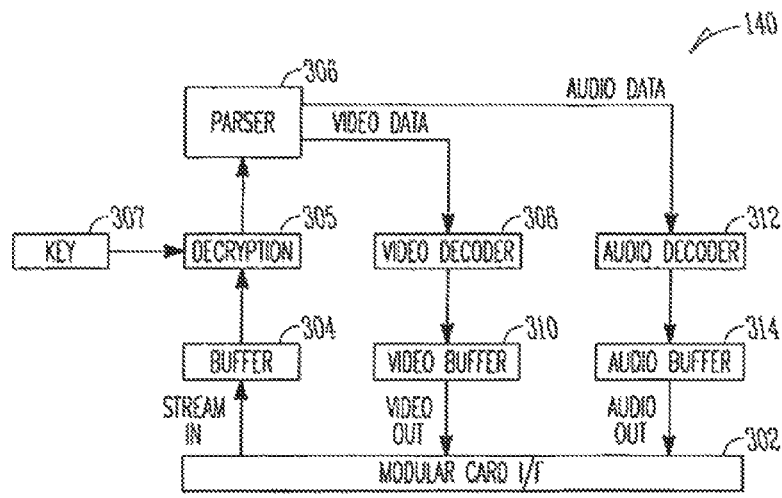
FIG. 3 illustrates a block diagram of an embodiment of a multimedia decoder modular card architecture.

Referring to FIG. 3, an example embodiment of the multimedia decoder modular card 140 is illustrated in accordance with at least one embodiment of the present disclosure. In the example depicted, the multimedia decoder modular card 140 includes a modular card receptacle interface 302, an input buffer 304, a decryption module 305, a parser 306, a video decoder 308, a video output buffer 310, and an audio decoder 312 and an audio output buffer 314. In a particular embodiment, the incoming buffer 304 and the output buffers 310 and 314 may be implemented together as a single buffer.

During operation, incoming multimedia data that is to be processed by the decoder modular card 140 is buffered in the incoming buffer 304. In at least one embodiment, the multimedia data is part of an MPEG data stream. Accordingly, the parser 306 parses the multimedia data to identify the relevant video and/or audio data to be processed. Then, the parser 306 provides the video data to the video decoder 308. The video decoder 308 decodes, or transcodes, the video data and the resulting decoded/transcoded data can be stored in the outgoing video buffer 310 before being provided to the bus 234 (FIG. 2) for transmission to one or more components of the television 100. Similarly, the audio decoder 312 decodes or transcodes the audio data. Audio data is decoded/transcoded by the audio decoder 312 and the resulting decoded/transcoded audio data is buffered in the outgoing audio buffer 314 before being provided to the bus 234 for transmission to one or more other components of the television 100.

Alternatively, in one embodiment, the received multimedia data includes non-coded multimedia data. In this instance, the video decoder 308 also may provide a video encoder to encode the video data to generate encoded video data, for example MPEG data, and the audio decoder 312 may include an audio encoder to encode the audio data to generate encoded audio data.

In at least one embodiment, the received multimedia data is encrypted or otherwise protected to prevent unauthorized access to the multimedia content. Accordingly, in at least one embodiment, the integrated decoder modular card 140 further comprises a decryption module 305 to process the protected multimedia data to generate unprotected multimedia data using a decryption key 307 supplied by, for example, a provider of the protected multimedia data. In one embodiment, the decryption module 305 processes the protected multimedia data before it is provided to the parser 306. Alternatively, the decryption module 305 could be implemented at the output of the parser 306 or as part of the decoders 308 and 312.

Figure 4:
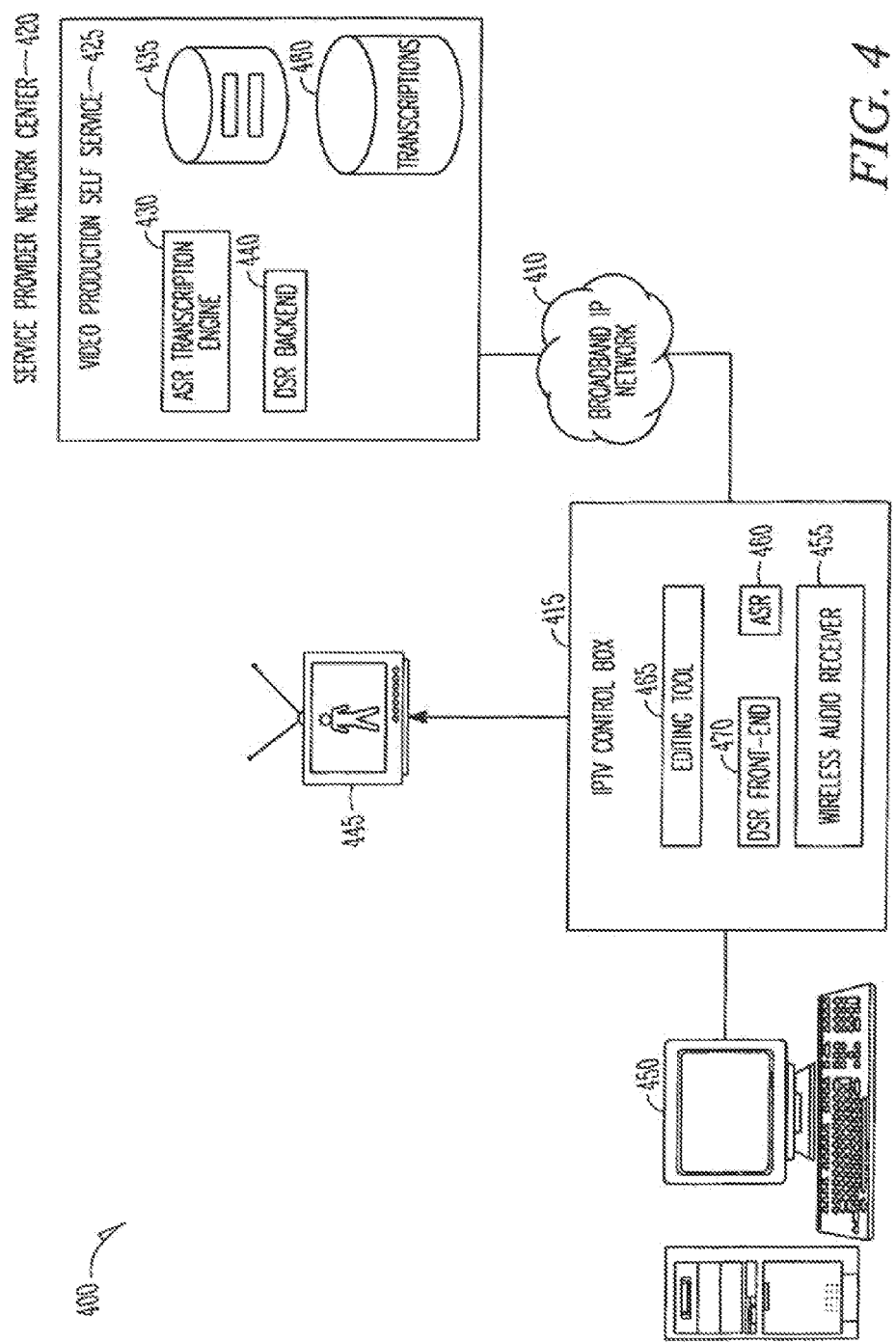
FIG. 4 illustrates an example embodiment of a system for authoring video content on an IPTV system.

FIG. 4 illustrates an embodiment of an authoring system for an IPTV network. The system 400 may include the networked television of FIG. 1, the networked television architecture of FIG. 2, and the multimedia decoder modular card architecture of FIG. 3. The IPTV system of FIG. 4 may further include a broadband IP network 410. Coupled to the IP network 410 is an IPTV service provider network center 420 that includes a video production service 425. The video production service 425 includes an automatic speech recognition (ASR) transcription engine 430, a database 435, a transcription database 480, and a dynamic source routing (DSR) backend 440. The IP network 410 is coupled to a plurality of IPTV set top (control) boxes 415. Only a single IPTV set top box 415 is illustrated in FIG. 4 for ease of illustration. The IPTV set top box 415 is coupled to a television display unit 445 and an IPTV subscriber's video database 450. A subscriber is any entity that is provided access to the channel content of the IPTV network. The subscriber's video database may be a personal computer. The IPTV set top box further includes a wireless audio receiver 455, an automatic speech recognition (ASR) module 460, an editing tool 465, and a DSR front end 470.

Figure 5:
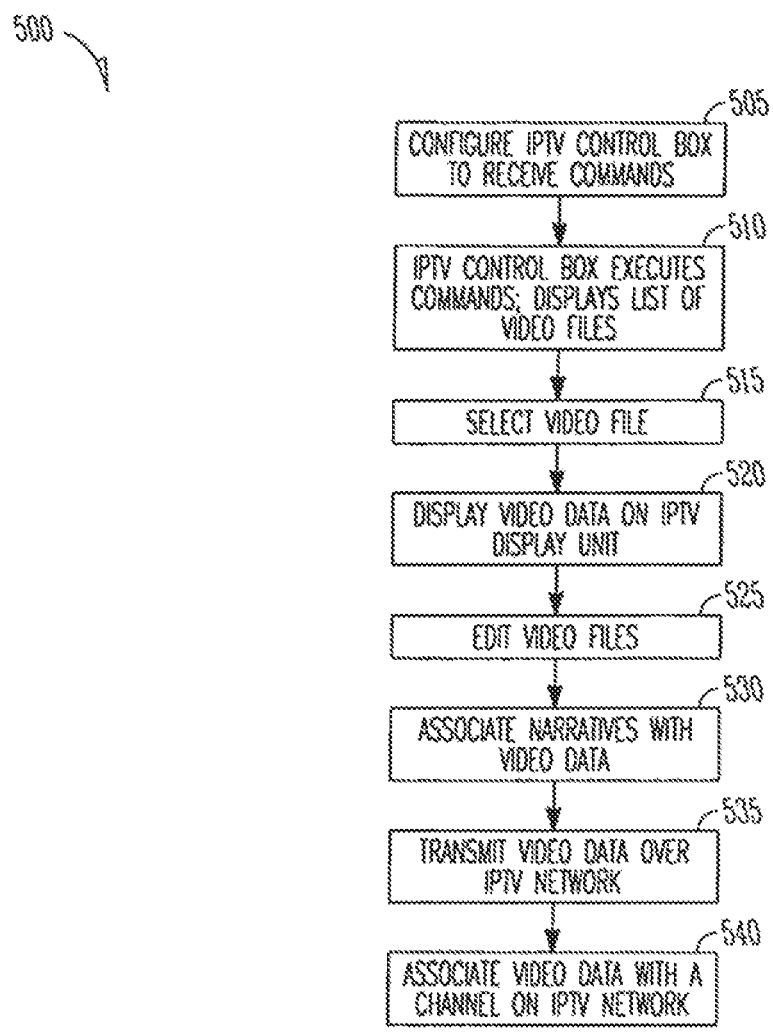
FIG. 5 illustrates an example process for authoring video content on an IPTV system.

FIG. 5 illustrates an embodiment of a process 500 that may be used by a subscriber to an IPTV network to author a video sequence that may subsequently be distributed over an IPTV network and displayed to one or more subscribers on the IPTV network.

FIG. 5 illustrates that at 505, an IPTV set top box is configured to receive commands. These commands may originate from a remote device such as a typical remote control for a television, and may be of the form of voice commands, IR-based signal commands, and/or manual commands such as that from a computer mouse. At 510, the IPTV set top box executes these commands, and displays a list of video files from the subscriber's video database on a television display unit. The IPTV set top box may then receive commands that permit a user to review the files available from the subscriber's video database, and then to select a particular video file at 515. After the selection of the video file, the IPTV set top box displays the video data from that file on the IPTV display unit at 520. The displayed video data may be one or more still images, and/or one or more video clips.

At 525, the IPTV receives additional commands, and in conjunction with an editing tool, permits a user to edit the content of the video files. The editing tool permits any type of editing as is known in the art such as cropping images, combining images, overlaying images, concatenating images, deleting scenes, etc. At 530, the IPTV set top box further receives commands and narratives, and associates the narratives with the video sequences on the IPTV display unit. In an embodiment, those narratives may be converted into text by an automatic speech transcription engine for display on the IPTV display unit in connection with the video data, and in another embodiment, the text may be converted into one or more different languages by the automatic speech transcription engine. After the completion of the editing and any other manipulation of the video data such as the addition of narratives, the IPTV set top box is configured at 535 to receive commands to transmit the video data over an IPTV network to an IPTV server.

In a particular embodiment, the editing of the video files includes editing and re-editing a still image, thereby turning a still picture into a mini-documentary. For example, a still image may be brought up on the IPTV display unit, and IR-based (or other type) commands may be used to first zoom into various parts of the still picture frame, and then overlaying an audio track for each particular zoomed-in part of the still picture frame. The result is a multi-frame mini-documentary, with each zoomed-in (or zoomed-out) portion of the picture including an audio track. The plurality of frames may then be displayed on an assigned channel and appear as a seamless sequence of video frames with inter-frame transition corresponding to cursor movement during the editing process and the duration of the author's voice between each click.

At 540, the IPTV server provider associates the file containing the subscriber video database with one of the IPTV's channels during a certain time slot. This video data may then be viewed by any subscriber to the IPTV network who has access to the channel with which the subscriber's video data is associated.

Figure 6:
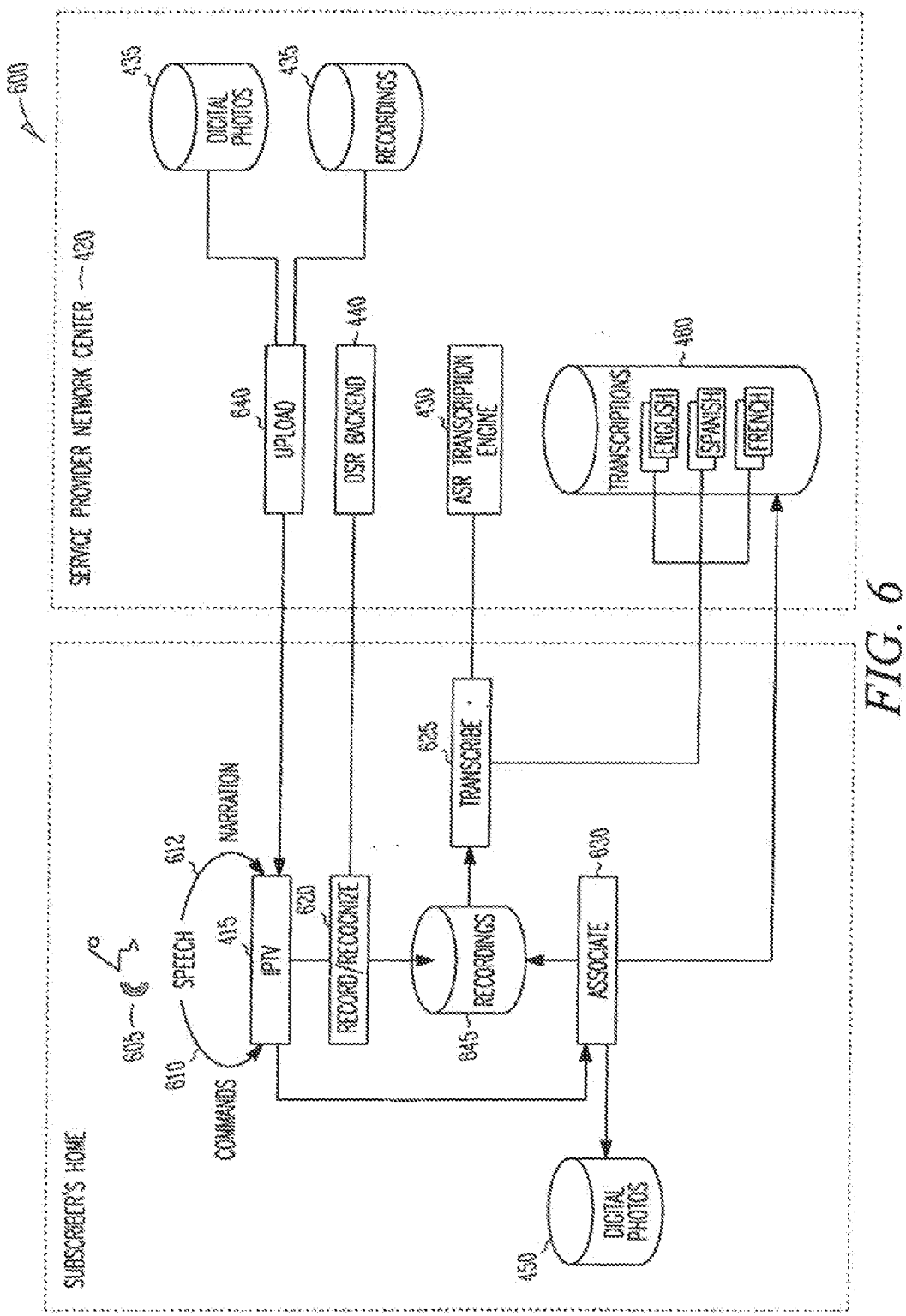
FIG. 6 illustrates an example process in block diagram form for authoring video content on an IPTV system.

FIG. 6 illustrates another example process 600, in block diagram form, for authoring video content on an IPTV system. A subscriber 605 may issue speech commands 610 to the IPTV set top box 415. These commands will retrieve video data from the database 450. Thereafter, the subscriber 605 may want to supply a narrative to be associated with the video data. The subscriber supplies a narrative at 612, and it is received by the IPTV set top box 415. The narratives are recorded and/or recognized at 620, and may be transcribed into text in one or more languages at 625 via the transcription engine 430 and the transcription database 480. The narratives and/or text are then associated with the video data at 630, transmitted over the IPTV network, and stored in the IPTV database 435. The video and audio data may then be uploaded and associated with a channel at 640 for viewing by one or more subscribers.

Figure 7:
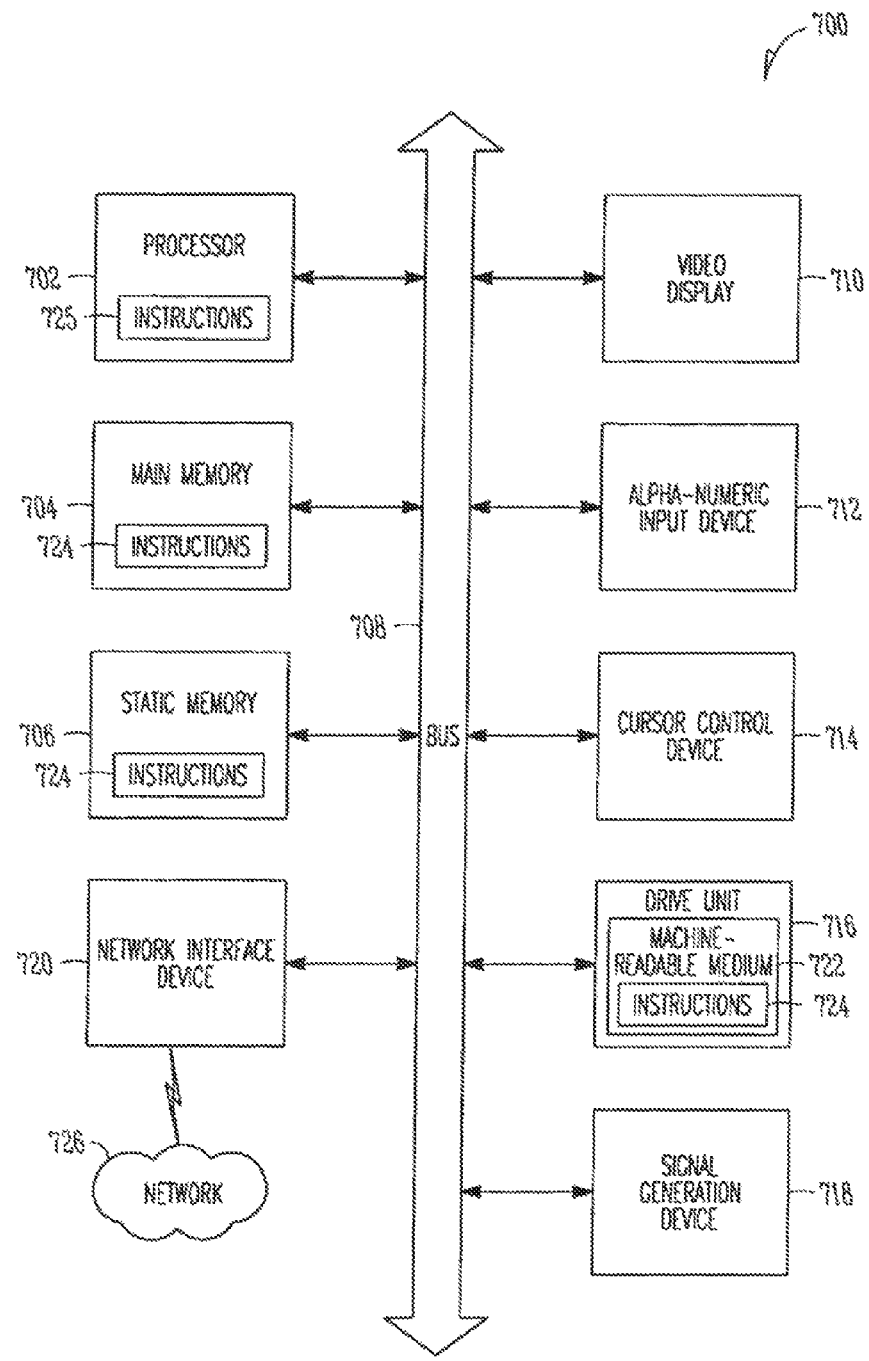
FIG. 7 illustrates an example computer architecture upon which one or more IPTV television networks may operate.

FIG. 7 is an illustrative embodiment of a computer system 700 to implement one or more of the disclosed techniques. The computer system 700 may include a set of instructions that can be executed to cause the computer system 700 to execute any one or more of the methods or computer based functions disclosed herein. The computer system 700 may operate as a standalone device or may be connected, for example, using a network, to other computer systems or peripheral devices.

The computer system 700 of FIG. 7, in a networked environment, may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular phone, a web appliance, a network router, switch, or bridge, or any machine capable of executing a set of web instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (for example a central processing unit (CPU), a graphics processing unit (GPU), or both), a main memory 704 and a static memory 706, which communicate with each other via a bus 708. The computer system 700 may further include a video display unit 710 (for example a liquid crystal display (LCD) or a cathode ray tube (CRT)). The computer system 700 also includes an alphanumeric input device 712 (for example a keyboard), a user interface (UI) navigation device 714 (for example a mouse), a disk drive unit 716, a signal generation device 718 (for example a speaker), and a network interface device 720.

The disk drive 716 includes a machine readable medium 722 on which is stored one or more sets of instructions and data structures (for example, software 724) embodying or utilized by any one or more of the methodologies or functions described herein. The software 724 may also reside, completely or at least partially, within the main memory 704 and/or within the processor 702 during execution thereof by the computer system 700, the main memory 704, and the processor 702 also constituting machine readable media.

The software 724 may further be transmitted or received over a network 726 via the network interface device 720 utilizing any one or a number of well-known transfer protocols (for example, HTTP).

While the machine readable-medium 722 is shown in an example embodiment to be a single medium, the term "machine readable medium" should be taken to include a single medium or multiple media (for example, a centralized or distributed database, and/or associated caches and servers) that store the one or more sets of instructions. The term "machine readable medium" shall also be taken to include any medium that is capable of storing, encoding, or carrying a set of instructions for execution by the machine and that cause the machine to perform any one or more of the methodologies of the present invention, or that is capable of storing, encoding, or carrying data structures utilized by or associated with such a set of instructions. The term "machine readable medium" shall accordingly be taken to include, but not be limited to, solid state memories, optical and magnetic media, and carrier wave signals.

The above disclosed subject matter is to be considered illustrative and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The abstract is provided to comply with 37 C.F.R. 1.72(b) to allow a reader to quickly ascertain the nature and gist of the technical disclosure. The Abstract is submitted with the understanding that it will not be used to interpret or limit the scope or meaning of the claims.

What is claimed is:

1. A device comprising:
   a processing system including a processor; and
   a memory that stores executable instructions that, when executed by the processing system, facilitate performance of operations, comprising:
   receiving a speech command;
   retrieving, in response to the speech command, multimedia data from equipment of a service provider via a network interface, the multimedia data including video data;
   receiving an audio signal representing a verbal narrative;
   recording the verbal narrative;
   associating the verbal narrative with a frame in a sequence of frames of the video data, wherein the frame corresponds to a portion of an image in the received video data and wherein each frame includes an audio track associated with the frame;
   generating interframe transitions in the sequence of frames in accordance with editing commands, wherein a duration of the frame is based on a duration of the verbal narrative between successive interframe transitions; and
   transmitting the sequence of frames with the verbal narrative over the network for storage in a database as a subscriber authored presentation,
   wherein the service provider associates the database with a channel of the network, the subscriber authored presentation thereby being viewable by a network subscriber having access to the channel.

2. The device of claim 1, further comprising a control device coupled to the processor, wherein the speech command and the editing commands are received via the control device, and wherein the operations further comprise storing the video data.

3. The device of claim 1, further comprising a display device coupled to the processor, and wherein the operations further comprise:
   presenting a still image on the display device;
   generating the frame based on the still image in response to the editing commands;
   generating the interframe transitions corresponding to interframe cursor movements; and
   presenting the sequence of frames and the associated verbal narrative as a presentation on the display device,
   wherein the duration of the frame corresponds to the duration of the verbal narrative between successive interframe cursor movements.

4. The device of claim 1, wherein the operations further comprise:
   decrypting the multimedia data; and
   parsing the multimedia data to identify the video data and audio data.

5. The device of claim 4, further comprising a video decoder and an audio decoder coupled to the processor, and wherein the operations further comprise decoding the video data by the video decoder and decoding the audio data by the audio decoder subsequent to the parsing.

6. The device of claim 5, wherein the video decoder and the audio decoder comprise a modular card device coupled to the processor via a modular card interface.

7. The device of claim 4, wherein the operations further comprise receiving a decryption key from the service provider.

8. The device of claim 4, wherein the operations further comprise recognizing speech in the audio data.

9. The device of claim 8, wherein the operations further comprise receiving a transcription of the speech recognized in the audio data.

10. The device of claim 1, wherein the operations further comprise:
   receiving a transcription of the verbal narrative comprising a text narrative; and
   associating the text narrative with the video data.

11. The device of claim 10, wherein the processor is coupled via the network to an automatic transcription engine performing the transcription and to a transcription database.

12. A method comprising:
   receiving, by a processing system including a processor, a speech command;
   retrieving, by the processing system and in response to the speech command, video data from a first database of a service provider;
   recording, by the processing system, a verbal narrative;
   associating, by the processing system, the verbal narrative with a frame of a sequence of frames of the video data, wherein the frame corresponds to a portion of an image in the video data, wherein each frame includes an audio track associated with the frame, and wherein an interframe transition in the sequence of frames is generated in accordance with an editing command, and wherein a duration of the frame is based on a duration of the verbal narrative between successive interframe transitions; and
   transmitting, by the processing system, the sequence of frames with the verbal narrative over a network for storage as a subscriber authored presentation in a second database remote from the first database,
   wherein the service provider associates the second database with a channel of the network, the subscriber authored presentation thereby being viewable by a network subscriber having access to the channel.

13. The method of claim 12, further comprising:
   receiving, by the processing system, a transcription of the verbal narrative comprising a text narrative; and
   associating, by the processing system, the text narrative with the video data.

14. The method of claim 13, wherein the processor is coupled via the network to an automatic transcription engine performing the transcription and to a transcription database.

15. The method of claim 13, wherein the text narrative is received in a language other than that of the verbal narrative.

16. The method of claim 12, wherein the subscriber authored presentation is assigned to the channel for viewing over the channel during a predetermined time period.

17. A machine-readable storage device comprising instructions which, when executed by a processing system including a processor, cause the processor to perform operations comprising:
   receiving a speech command;
   retrieving, in response to the speech command, video data from a first database of a service provider;
   recording a verbal narrative;
   associating the verbal narrative with a frame of a sequence of frames of the video data, wherein the frame corresponds to a portion of an image in the video data, wherein each frame includes an audio track associated with the frame, wherein an interframe transition in the sequence of frames is generated in accordance with an editing command, and wherein a duration of a frame is based on a duration of the verbal narrative between successive interframe transitions; and
   transmitting the sequence of frames with the verbal narrative over a network for storage as a subscriber authored presentation in a second database remote from the first database,
   wherein the service provider associates the second database with a channel of the network, the subscriber authored presentation thereby being viewable by a network subscriber having access to the channel.

18. The machine-readable storage device of claim 17, wherein the operations further comprise decoding the video data.

19. The machine-readable storage device of claim 17, wherein the operations further comprise:
   receiving a transcription of the verbal narrative comprising a text narrative; and
   associating the text narrative with the video data.

20. The machine-readable storage device of claim 17, wherein the subscriber authored presentation is assigned to the channel for viewing over the channel during a predetermined time period.

\* \* \* \* \*